April 26, 1938.  E. DAVID ET AL  2,115,255
TRANSFER MEANS FOR CONVEYERS
Filed Oct. 15, 1937
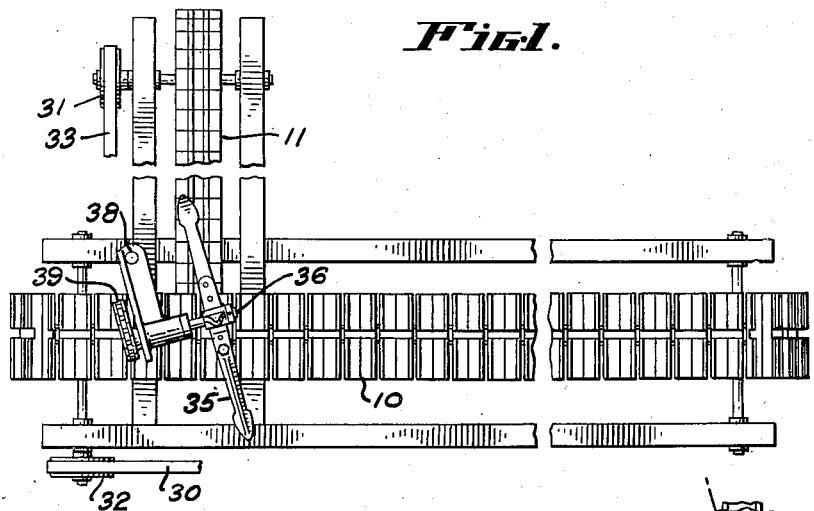
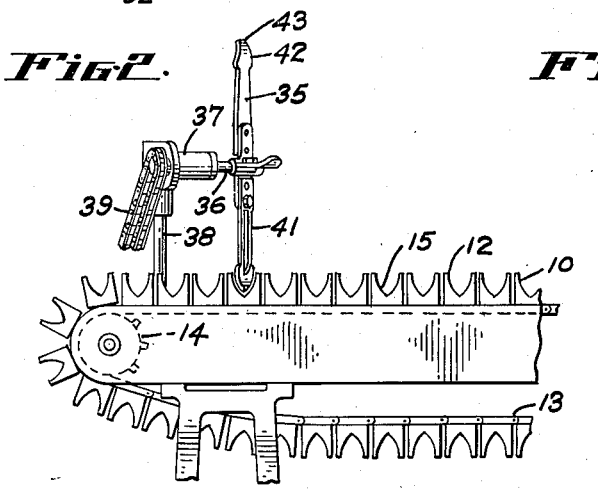
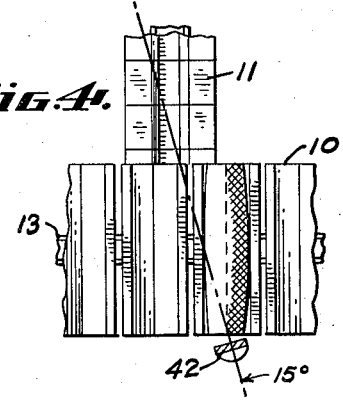
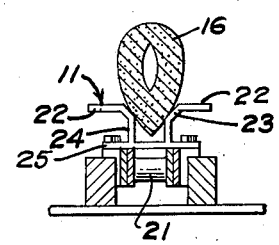
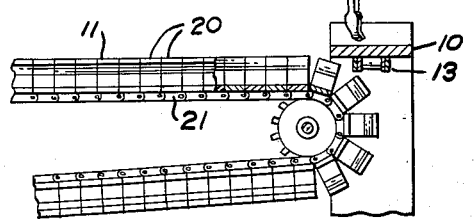
INVENTORS
EDWARD DAVID
STEPHEN B. SZODY
BY
Jas. M. Naylor
ATTORNEY Patented Apr. 26, 1938

2,115,255

UNITED STATES PATENT OFFICE 2,115,255

TRANSFER MEANS FOR CONVEYERS

Edward David, Carmel, and Stephen B. Szody, Seaside, Calif.

Application October 15, 1937, Serial No. 169,164

6 Claims. (Cl. 198—25)

This is a continuation in part of our application Serial No. 52,394, filed November 30, 1935, for improvements in Fish cutting machines, now Patent No. 2,110,416.

This invention relates to transfer means for conveyers arranged in planes at right angles to each other.

An object of the invention is to provide means for transferring articles from one conveyer to the other without interruption to the movement of the two conveyers and with particular attention being paid to the proper introduction of the article being transferred to the second conveyer from the first.

The invention relates more particularly to the provision of a transfer means which will be suitable for the purpose of transferring fish or portions thereof from a conveyer passing through fish cutting means to a second conveyer arranged in a plane at right angles to the first conveyer, said second conveyer serving to move the fish to a second cutting apparatus.

One form of conveyer frequently employed in conjunction with the handling of fish and like articles consists of a plurality of articulated blocks arranged in side by side or end to end relation on a chain or belt, the said blocks having a groove therein of a shape corresponding substantially to the fish or other article being handled. The desirability of this class of conveyer arose through the need of providing some means for movement of the fish through cutting mechanisms whereby a complete cut could be made through the fish. At the same time it was desired that the fish be presented in uniform alignment for the action of the cutters.

The present invention contemplates the provision of a transfer means positioned above one conveyer of the type mentioned and adapted to effect the transfer by pushing the article being conveyed through the groove in the block on the conveyer to a groove in the second conveyer at right angles to the first.

Of the many transfer means observed in the art it is believed that no one has heretofore thought or given much care to the development of a device which could be adjusted to work in perfect timed relation with the movement of the two conveyers or which would effectively serve to transfer the article being handled in the necessary alignment or without disfiguring or marring the article being handled.

It is believed that the present invention overcomes the deficiencies of the prior art and provides a simple structure which is highly satisfactory for the purpose intended.

These and other objects of the invention will become more apparent as this specification proceeds and the novelty thereof will be particularly pointed out in the appended claims.

In the drawing forming a part hereof,

Figure 1 is a top plan view of the invention,

Figure 2 is a side elevation of the first conveyer means showing the transfer mechanism angularly arranged with respect thereto, Figure 3 is a side elevation of the second conveyer means with the first conveyer shown in section and the transfer means arranged above the latter, Figure 4 is a diagrammatical plan view showing the direction of movement of the element of the transfer means, Figure 5 is an end elevation of one of the links or blocks of the second conveyer with a fish in the groove thereof.

The numerals 10 and 11 designate generally a pair of endless conveyers arranged in planes at right angles to each other. Conveyer 10 is comprised of a plurality of blocks 12 arranged in side by side relation on a chain 13 engaged by the sprocket 14. Each of the blocks 12 has a longitudinal groove 15 therein adapted to conform substantially to the shape of a fish, or a segment or cut thereof, such as is illustrated at 16 in Fig. 5. Initially, as the fish are placed in the groove 15 of blocks 12, their heads and tails project beyond the ends of the said blocks 12 and it is in this condition that they are transported by the conveyer 10 through known cutting mechanisms which remove their heads, tails and entrails. The present invention does not concern itself with such cutting mechanisms but only in the transfer of the fish thus prepared to a second conveyer, such as is designated by the numeral 11, by which they will be passed to other cutting apparatus.

The conveying means generally designated by the numeral 11 comprises a plurality of blocks or links 20 arranged on and secured to a chain 21 in end to end relation (see Figs. 3 and 5). Each of the blocks or links 20 has a pair of outwardly extending flat portions 22 bent downwardly at complementary 45° angles as at 23, and then into straight walls 24 to the point of jointure with a base plate 25, by which they are connected to the links of chain 21. It will be understood that the fish are supported on conveyer 20 largely by being wedged in the slots formed by the angles 23 and the walls 24. This arrangement is employed so as to enable the cutting means to pass through the fish completely.

The conveyers 10 and 11 are driven independently of each other by any conventional means such as the belts 30 and 33 and the pulleys 32 and 31, respectively.

It will be noted in Fig. 3 of the drawing that the intake end of conveyer 11 is positioned under conveyer 10, and that there is but a small amount of clearance between the link members 20 on conveyer 11 and the block members 12 on conveyer 10. Thus fish swept from the grooves 15 of blocks 12 on conveyer 13 drop a small distance to the longitudinal groove in the link members 20 of conveyer 11.

A spider-like element 35 is fixed on a shaft 36 suitably journaled in a bearing member 37 supported on a post 38 seated in the frame of the conveyer mechanism. A sprocket on the end of shaft 36, opposite to that on which the spider-like element 35 is mounted, engages a chain 39 driven by any conventional prime mover (not shown).

The spider-like element 35, in the preferred form of the invention illustrated in the drawing, is provided with a plurality of arms or blades 41, the ends of each of which are fashioned into a spade-like shape 42, the tips of which are curved rearwardly as at 43 with respect to the direction of movement. The function of the spade-like tip 42 of the arms or blades 41 is to obviate any marring or gashing of the fish in the transfer process, it being understood that the motion imparted to the fish in the transfer movement is a gentle, sweeping motion.

As is illustrated in Figures 1 to 4, inclusive, the spider-like element 35 is so arranged above conveyer 10 that the sweep of the blades 41 is at approximately a 15° angle to the transverse grooves 15 of the conveyer 10. This arrangement, coupled with the fact that the rotation of the spider-like element 35 is correlated with movement of conveyer 10, causes the spade-like tips 42 of the arms 41 to enter grooves 15 and sweep therethrough as conveyer 10 is moved. In this movement it will be appreciated that the tips 42 of arms 41 pass through the grooves 15 without touching any portion of the blocks 12, moving the fish the length of the blocks to enter the longitudinal slot in conveyer 11 formed by its individual links 20.

It is to be understood that the invention forming the subject matter of the present application is subject to modification and we do not, therefore, wish to be understood as limiting ourselves to the preferred form only, but desire protection according to the scope of the appended claims.

We claim:

1. Means for effecting the transfer of fish from a first conveyer formed of a plurality of articulated blocks each having a groove extending transversely of the conveyer to a second conveyer running at right angles to the first and formed by a plurality of links defining a longitudinally extending fish receiving slot therein, comprising, a spider mounted above said first conveyer, the arms of said spider passing through the grooves in the blocks of the first conveyer to move the fish into the longitudinal slot in the second conveyer.

2. Means for effecting the transfer of fish from a first conveyer formed of a plurality of articulated blocks each having a groove extending transversely of the conveyer to a second conveyer running at right angles to the first and formed by a plurality of links defining a longitudinally extending fish receiving slot therein, comprising, a spider disposed above said first conveyer at an angle to the direction of its movement, the arms of said spider passing through the grooves in the blocks of said first conveyer to move the fish into the longitudinal slot in the second conveyer.

3. Means for effecting the transfer of fish from a first conveyer formed of a plurality of articulated blocks each having a groove extending transversely of the conveyer to a second conveyer running at right angles to the first and formed by a plurality of links defining a longitudinally extending fish receiving slot therein, comprising, a spider disposed above said first conveyer, the rotation of said spider being in timed relation to movement of said first conveyer, the arms of said spider passing through the grooves in the blocks on the first conveyer to move the fish therefrom to the longitudinal slot of the second conveyer, rotation of the arms of said spider being at approximately a 15° angle to the direction of the grooves of said first conveyer.

4. Means for effecting the transfer of fish from a first conveyer formed of a plurality of articulated blocks each having a groove extending transversely of the conveyer to a second conveyer running at right angles to the first and formed by a plurality of links defining a longitudinally extending fish receiving slot therein, comprising a spider disposed above the first named conveyer with blades adapted to sweep through the grooves in the blocks thereof to move fish carried thereby to the slot of the second named conveyer, rotation of said spider being in timed relation to the travel of said first named conveyer.

5. In a device of the class described the combination with a first conveyer formed by a plurality of articulated blocks each having a groove extending transversely of the conveyer, a second conveyer running at right angles to the first and formed by a plurality of links defining a longitudinally extending slot therein, a spider disposed above the first named conveyer, said spider having blades adapted to sweep through the grooves in the blocks of said first conveyer to move the material carried thereby to the slot in said second conveyer, the rotation of said spider being in timed relation to the travel of said first named conveyer.

6. In a device of the class described the combination with a first conveyer formed by a plurality of articulated blocks each having a groove extending transversely of the conveyer, a second conveyer running at right angles to the first and formed by a plurality of links defining a longitudinally extending slot therein, a spider disposed above the first named conveyer, said spider having blades adapted to sweep through the grooves in the blocks of said first conveyer to move the material carried thereby to the slot in said second conveyer, the disposition of said spider above said first conveyer being at such an angle that the blades thereof pass through the grooves in said blocks without touching the latter, the rotation of said spider being in timed relation to the travel of said first named conveyer.

EDWARD DAVID.
STEPHEN B. SZODY.